(12) United States Patent
Kim et al.

(10) Patent No.: US 7,876,389 B2
(45) Date of Patent: Jan. 25, 2011

(54) DISPLAY SUBSTRATE AND DISPLAY DEVICE HAVING THE SAME

(75) Inventors: Dong-Gyu Kim, Yongin-si (KR); Sung-Jae Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 12/272,063

(22) Filed: Nov. 17, 2008

(65) Prior Publication Data

US 2009/0213286 A1 Aug. 27, 2009

(30) Foreign Application Priority Data

Feb. 27, 2008 (KR) .................... 10-2008-0017648

(51) Int. Cl.
*G02F 1/1343* (2006.01)
(52) U.S. Cl. ...................................... 349/39
(58) Field of Classification Search ............. None
See application file for complete search history.

(56) References Cited

U.S. PATENT DOCUMENTS

2007/0109482 A1*  5/2007  Kim ..................... 349/144
2008/0165309 A1*  7/2008  Ge et al. ................ 349/85
2009/0027581 A1*  1/2009  You et al. .............. 349/48

FOREIGN PATENT DOCUMENTS

| JP | 07152013 | 6/1995 |
|---|---|---|
| KR | 1020070051045 | 5/2007 |
| KR | 1020070057388 | 6/2007 |

* cited by examiner

*Primary Examiner*—Sung H Pak
(74) *Attorney, Agent, or Firm*—H.C. Park & Associates, PLC

(57) ABSTRACT

A display may include a plurality of pixels disposed in a matrix. Each pixel may include a first sub-pixel electrode and a second sub-pixel electrode to be charged with a different voltage than the first sub-pixel electrode. A portion of each of the first sub-pixel electrode and the second sub-pixel electrode is V-shaped and the V-shaped portion of the first sub-pixel electrode faces the V-shaped portion of the second sub-pixel electrode. The display further includes a gate line extending in a first direction, a first storage electrode line and a second storage electrode line extending in the first direction and capacitively coupled to the first sub-pixel electrode and the second sub-pixel electrode, respectively, a charge control line extending in the first direction and coupled to the pixel, and a first data line and a second data line extending in a second direction and intersecting the gate line. TFTs may be disposed separately in an area non-overlapped by a sub-crossing pixel electrode.

20 Claims, 4 Drawing Sheets

DISPLAY SUBSTRATE AND DISPLAY DEVICE HAVING THE SAME

CROSS-REFERENCE TO RELATED APPLICATION

This application claims priority from and the benefit of Korean Patent Application No. 10-2008-0017648, filed on Feb. 27, 2008, which is hereby incorporated by reference for all purposes as is fully set forth herein.

BACKGROUND OF INVENTION

1. Field of the Invention

The present invention relates to a display substrate and a display device that may reduce image retention and vertical crosstalk and improve visibility.

2. Discussion of the Background

The liquid crystal display (LCD) device is being actively developed because it may have a small volume, be lightweight, and have a large screen as compared to a typical cathode ray tube (CRT). An LCD displays an image using a plurality of unit pixels, and each unit pixel includes a thin film transistor (TFT) and a liquid crystal capacitor. The liquid crystal capacitor includes a pixel electrode, a common electrode, and a liquid crystal layer disposed therebetween. In an LCD device, an electric field between the pixel electrode and the common electrode is changed in response to external charges, i.e., data signals, applied to the pixel electrode through the TFT. As the electric field changes, the alignment of liquid crystal molecules may be changed, and thus the quantity of light transmitting through the liquid crystal molecules may be changed. Therefore, the LCD device may display a desired image. However, the LCD device may have poor visibility due to the inherent characteristics of the liquid crystal molecules.

The resolution of the LCD is proportional to the number of unit pixels provided in a unit area. As the number of unit pixels per unit area increases, the resolution increases. However, as the resolution increases, the number of scanning lines, i.e., gate lines, is increased, and therefore the time to charge external charges into one pixel electrode may be decreased. This may make it difficult for the LCD device to display a desired image. Therefore, it may be necessary to decrease the resistance or capacitance of gate lines in order to decrease the signal delay. However, vertical crosstalk may occur due to a parasitic capacitance between the data lines and the pixel electrodes.

SUMMARY OF INVENTION

The present invention provides a display substrate that may provide for improved display quality.

The present invention also provides a liquid crystal display device including the display substrate.

Additional features of the invention will be set forth in the description which follows, and in part will be apparent from the description, or may be learned by practice of the invention.

The present invention discloses a display substrate including a plurality of pixels disposed in a matrix, a gate line extending in a first direction, first and second storage electrode lines extending in the first direction, a charge control line extending in the first direction, and a first data line and a second data line extending in a second direction and crossing the gate line. Each pixel includes a first sub-pixel electrode and a second sub-pixel electrode to be charged with a different voltage than the first sub-pixel electrode. A portion of each of the first sub-pixel electrode and the second sub-pixel electrode is V-shaped, and the V-shaped portion of the first sub-pixel electrode faces the V-shaped portion of the second sub-pixel electrode. The first and second storage electrode lines are capacitively coupled to the first and second pixel electrodes, respectively. The charge control line is coupled to the second sub-pixel electrode.

The present invention also discloses a liquid crystal display device including a first substrate including a domain control part, a second substrate opposed to the first substrate, and a liquid crystal layer disposed between the first substrate and the second substrate. The second substrate includes a plurality of pixels disposed in a matrix, a gate line extending in a first direction, first and second storage electrode line extending in the first direction, a charge control line extending in the first direction, and a first data line and a second data line extending in a second direction and crossing the gate line. Each pixel includes a first sub-pixel electrode and a second sub-pixel electrode to be charged with a different voltage than the first sub-pixel electrode. A portion of each of the first sub-pixel electrode and the second sub-pixel electrode is V-shaped, and the V-shaped portion of the first sub-pixel electrode faces the V-shaped portion of the second sub-pixel electrode. The first and second storage electrode lines are capacitively coupled to the first and second pixel electrodes, respectively. The charge control line is coupled to the second sub-pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
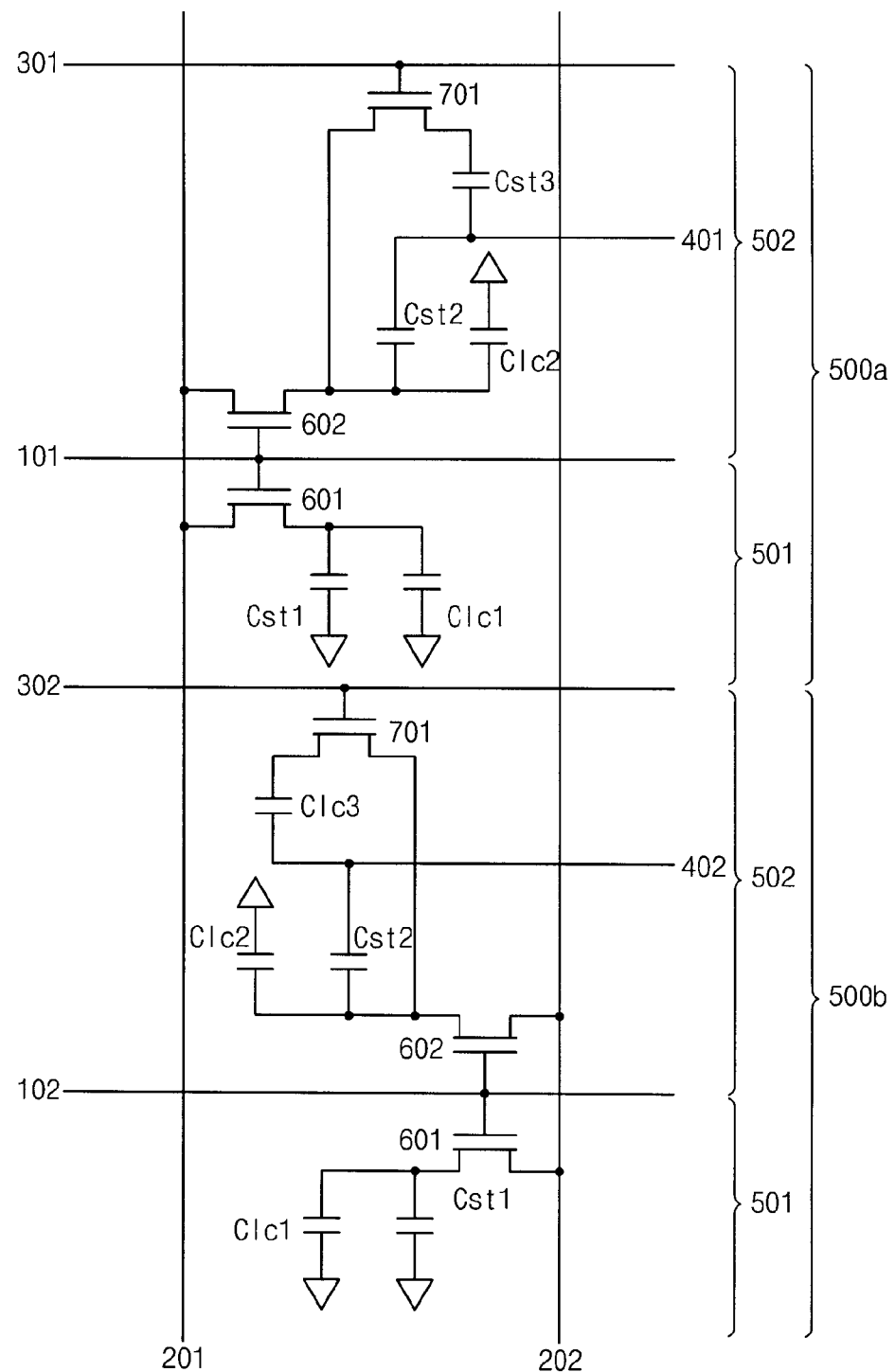
FIG. 1 is a schematic view of a display device in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
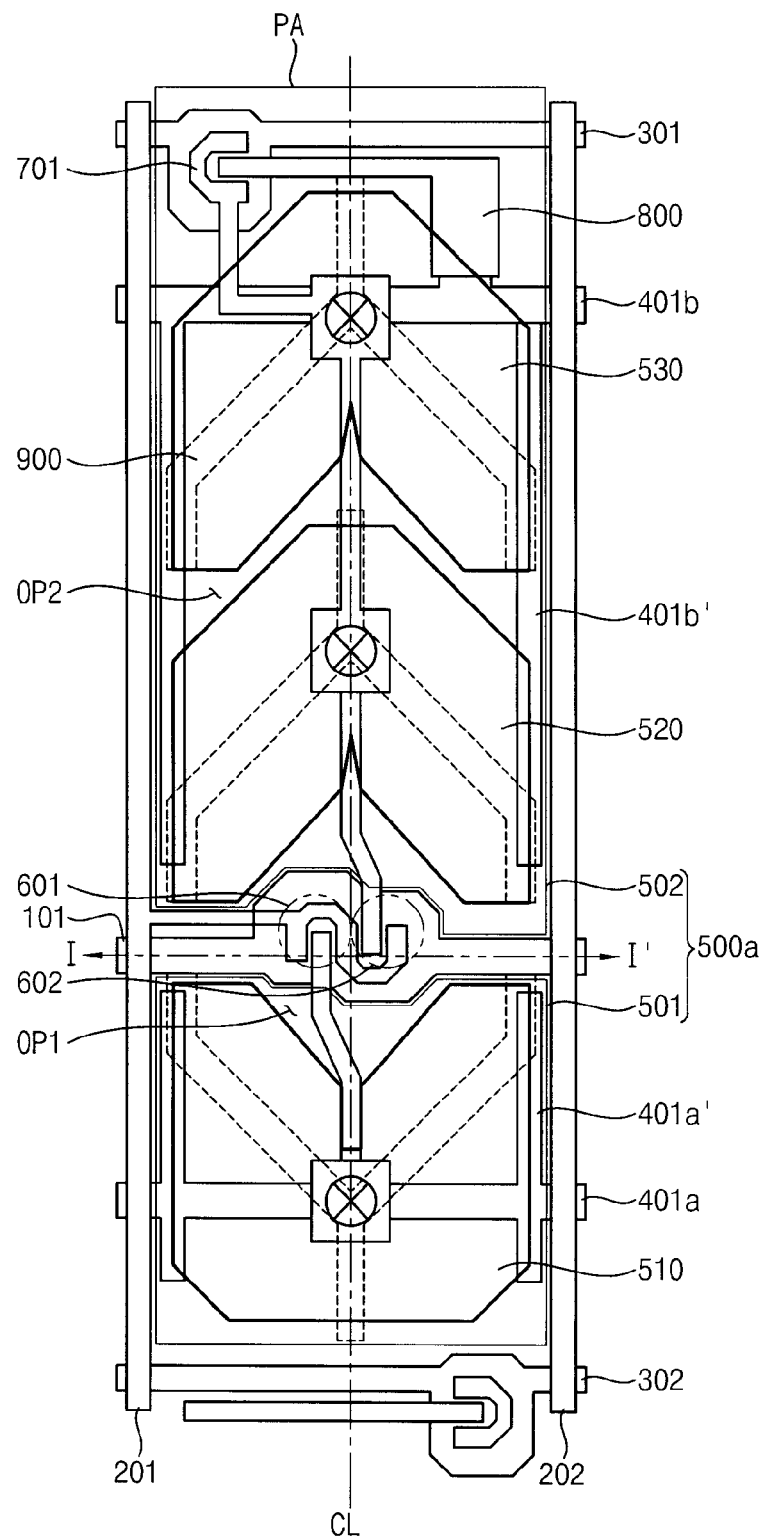
FIG. 2 is a plan view of the display device in accordance with the exemplary embodiment of the present invention.

FIG. 1 is a schematic view of a display device in accordance with an exemplary embodiment of the present invention and FIG. 2 is a plan view of the display device in accordance with the exemplary embodiment of the present invention.

Referring to FIG. 1 and FIG. 2, a display device includes a pixel matrix, a plurality of gate lines 101 and 102, a plurality of first data lines 201, a plurality of second data lines 202, and a plurality of charge control lines 301 and 302.

A pixel matrix includes a plurality of unit pixels. The pixel matrix includes a plurality of pixel columns and a plurality of pixel rows. Each unit pixel may include a color filter including red, green, and blue sub-color filters.

Each unit pixel may include a first sub-pixel 501 and a second sub-pixel 502. Of course, the unit pixel may include more than two sub-pixels.

The first sub-pixel 501 may include a first thin film transistor 601, a first liquid crystal (LC) capacitor Clc1 and a first storage capacitor Cst1.

A gate electrode of the first TFT 601 may be connected to a gate line 101 or 102, a source electrode of the first TFT 601 may be connected to the first data line 201 or the second data line 202, and a drain electrode of the first TFT 601 may be connected to the first LC capacitor Clc1 and the first storage capacitor Cst1.

The second sub-pixel 502 may include a second thin film transistor 602, a third thin film transistor 701, a second liquid crystal (LC) capacitor Clc2, a second storage capacitor Cst2, and a third storage capacitor Cst3.

A gate electrode of the second TFT 602 may be connected to a gate line 101 or 102, a source electrode of the second TFT 602 may be connected to the first data line 201 or the second data line 202, and a drain electrode of the second TFT 602 may be connected the second LC capacitor Clc2 and the second storage capacitor Cst2.

A gate electrode of the third TFT 701 may be connected to a charge control line 301 or 302, a source electrode of the third TFT 701 may be connected to the second LC capacitor Clc2, and a drain electrode of the third TFT 701 may be connected the third storage capacitor Cst3. The third storage capacitor Cst3 may charge up or charge down. The third storage capacitor Cst3 may be connected to the drain electrode of the second TFT 602. Also the third TFT 701 may be disposed in an area not overlapped by a second pixel electrode 520 and 530.

A plurality of gate lines 101 and 102 may be elongated in a first direction or in a row direction. The plurality of gate lines 101 102 are connected to the pixel arranged in the first direction. In other words, each gate line 101 and 102 is connected to each pixel arranged in a row.

A plurality of gate lines 101 and 102 is disposed in the pixel area PA transversely, as shown in FIG. 2. The gate line 101 may partially overlap with the unit pixel area PA. Alternatively, the sub-pixel electrodes 510, 520, and 530 may be spaced apart from the gate line to decrease the load between the sub-pixels 501 and 502 and the gate line 101.

As shown in FIG. 2, a first data line 201 is disposed on the left side of the pixel and a second data line 202 is disposed on the right side of the pixel. The pixels disposed in odd rows are connected to the first data line 201, and the pixels disposed in even rows are connected to the second data line 202. In other words, the pixels are alternately connected to the first data line 201 and the second data line 202. These methods of connecting pixels and data lines may be applied to columns instead of rows.

In the exemplary embodiments of the present invention, an LCD device may further include a plurality of charge control lines 301 and 302 to control the amount of charging between the first sub-pixel 501 and the second sub-pixel 502. The plurality of charge control lines 301 and 302 is elongated transversely in the pixel matrix and is connected to a plurality of pixel rows. The charge control line 301 in the unit pixel is insulated from the gate line 101. In another exemplary embodiment of the present invention, the charge control line 301 may be connected to the next stage gate line 102. A turn-on time of the next stage gate line is overlapped with the turn-on time of the gate line. Thus, the visibility of LCD device may be improved.

When a gate turn-on voltage is applied to the gate line 101, the first sub-pixel 501 and the second sub-pixel 502 will be charged. Then, when the next stage gate turn-on voltage is supplied to the next stage gate line, the next stage gate turn-on voltage is supplied to the charge control line 301. The charge of one of the first sub-pixel 501 and the second sub-pixel 502 will be changed. In this exemplary embodiment, the visibility may be improved by decreasing the amount of charging in the second sub-pixel 502. Also, the charge control line 301 is not limited to the next stage gate line and may be an independently controlled line.

As shown in FIG. 2, in this exemplary embodiment, the first sub-pixel 501 includes a first sub-pixel electrode 510 and the second sub-pixel 502 includes second sub-pixel electrodes 520 and 530. The first sub-pixel 501 and the second sub-pixel 502 may include various numbers of sub-pixel electrodes without being limited to the above discussed exemplary embodiment. The first sub-pixel electrode 510 and the second sub-pixel electrodes 520 and 530 each include a V-shaped portion to make a multi-domain area. The V-shaped portions of the first sub-pixel electrode 510 face the V-shaped portions of the second sub-pixel electrodes 520 and 530 and define an open region OP1 that is not overlapped by the pixel electrodes 510, 520, and 530. A first TFT 601 and a second TFT 602 that control the first sub-pixel electrode 510 and the second sub-pixel electrode 520, respectively, are disposed in the open region OP1 between the first sub-pixel electrode 510 and the second sub-pixel electrode 520.

For example, the first TFT 601 and the second TFT 602 are disposed where the first sub-pixel 501 and the second sub-pixel 502 face each other.

To decrease the load of the gate line 101, the gate line 101 is disposed in an area spaced apart from the sub-pixel electrodes 510, 520, and 530 and not overlapped by the sub-pixel electrodes 510, 520, and 530.

A storage electrode line 401 includes a first storage electrode line 401a and a second storage electrode line 401b and forms storage capacitors Cst1, Cst2, and Cst3 by overlapping the sub-pixel electrodes 510, 520, and 530. For example, the first storage electrode line 401a and the elongated pattern 401a' overlap a portion of the first sub-pixel electrode 510 to form the first storage capacitor Cst1. The second storage electrode line 401b, which includes the elongated pattern 401b', overlaps one of the second sub-pixel electrodes 520 to form the second storage capacitor Cst2, and overlaps the other second sub-pixel electrode 530 to form the third storage capacitor Cst3. In the above discussed exemplary embodiment, by making the parasitic capacitance made between the first and second sub-pixel electrodes 510, 520, and 530 and the first and the second data lines 201 and 202 substantially equal, vertical crosstalk may be minimized, so image quality may be improved.

Figure 3:
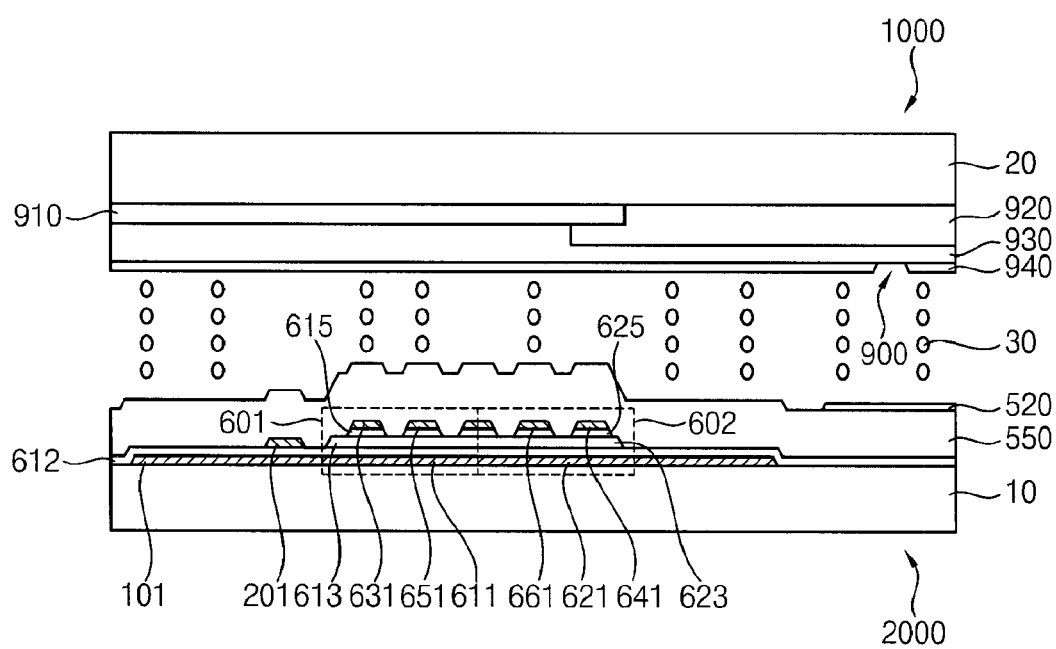
FIG. 3 is a cross-sectional view taken along line I-I' of FIG. 2.

FIG. 3 is a cross-sectional view taken along line I-I' of FIG. 2. Referring to FIG. 2 and FIG. 3, a display device in accordance with an exemplary embodiment includes a first substrate 1000 including a domain control member 900, a second substrate 2000 opposite the first substrate 1000, and a liquid crystal layer 300 disposed between the first substrate 1000 and the second substrate 2000.

The surfaces of the substrates 1000 and 2000 may be covered with an alignment layer (not shown) to align liquid crystal molecules 30 of the liquid crystal layer 300 disposed between the substrates 1000 and 2000. The display mode of the liquid crystal molecules 30 may be a patterned vertical aliment (PVA) mode or a vertical alignment (VA) mode.

The first substrate 1000 may include a translucent insulating substrate 20, a black matrix 910, a color filter 920, an over-coating layer 930, and common electrode 940.

The translucent insulating substrate 20 may include glass or plastic material.

The black matrix 910 is disposed on the translucent insulating substrate 20 and blocks light from being transmitted through the regions covered therewith. The black matrix 910 covers the first and second TFTs 601 and 602, the gate line 101, and the first and second data lines 201 and 202.

The first TFT 601 includes a first gate electrode 611, a first semiconductor pattern 613 disposed on the first gate electrode 611, a first ohmic contact layer 615 on the first semiconductor pattern 613, a first source electrode 631 disposed on the first ohmic contact layer 615, and a first drain electrode 651 on the first ohmic contact layer 615 and spaced apart from the first source electrode 631.

The second TFT 602 includes a second gate electrode 621, a second semiconductor pattern 623 disposed on the second gate electrode 621, a second ohmic contact layer 625 on the second semiconductor pattern 623, a second source electrode 641 disposed on the second ohmic contact layer 625, and a second drain electrode 661 on the second ohmic contact layer 625 and spaced apart from the second source electrode 641.

A gate insulating layer 612 covers the first gate electrode 611, the second gate electrode 621, and the gate line 101.

The color filter 920 includes red, green, and blue sub-color filters in each unit pixel. Each color filter 920 partially overlaps the black matrix 910.

An overcoat layer 930 serves to planarize the upper surface of the black matrix 910 and the color filter 920. A common electrode 940 is formed on the overcoat layer 930 and forms an electric field with the first and the second pixel electrodes 510, 520, and 530. The electric field controls the alignment of the liquid crystal molecules 30. In the exemplary embodiment, a portion of the common electrode 940 is patterned to form domain control members 900. The domain control members 900, including the V-shaped portions of the pixel electrodes 510, 520, and 530, are parallel with open regions OP1 and OP2 (see FIG. 2), respectively.

The electric field that is formed between the domain control members 900 formed on the common electrode 940 and the first and the second sub-pixel electrodes 510, 520, and 530, controls the alignment of the liquid crystal molecules. The aligned liquid crystal molecules form a multi-domain region. In the exemplary embodiment, the domain control members 900 are disposed alternately with the open regions OP1 and OP2. The multi domain region may be easily formed and may help to improve the viewing angle of a display device.

The second substrate 2000 includes a translucent insulating substrate 10. The translucent insulating substrate 10 may include glass or plastic material.

A plurality of gate lines 101, a plurality of first data lines 201, and a plurality of second data lines 202 are formed on the second substrate 2000. The first and the second data lines 201 and 202 cross the gate line 101. The first data line 201 and the second data line 202 are disposed on the left side and right side of the pixel column, respectively.

A portion of each of the first data line 201 and the second data line 202 protrudes to form a first TFT 601 and a second TFT 602, respectively. The first and second data lines 201 and 202 are linear in FIG. 2, but the data lines 201 and 202 may alternatively have a zigzag portion, a bent portion, or a curved portion.

The second substrate 2000 includes first and second LC capacitors Clc1 and Clc2 and first and second sub-pixel electrodes 510, 520, and 530, which form electrodes of the storage capacitors Cst1, Cst2, Cst3, respectively.

The first and the second sub-pixel electrodes 510, 520, and 530 may be formed of indium tin oxide (ITO) or indium zinc oxide (IZO).

The first sub-pixel electrode 510 and the second sub-pixel electrodes 520 and 530 are disposed in the unit pixel area PA. The first sub-pixel electrode 510 and the second sub-pixel electrodes 520 and 530 are separated from each other by the open regions OP1 and OP2. For example, the first sub-pixel electrode 510 is separated from the second electrode 520 and 530 by a first open region OP1, and the second pixel electrodes 520 and 530 are separated from each other by a second open region OP2.

As shown in FIG. 2 and FIG. 3, the first and the second sub-pixel electrodes 510, 520, and 530 each include a V-shaped portion. The first sub-pixel electrode 510 is disposed to face the second sub-pixel electrodes 520 and 530, which receive a different charging voltage. An open region OP1 is formed between the sub-pixel electrodes 510 and 520. The first TFT 601 and the second TFT 602 may be disposed in the open region OP1 without overlapping sub-pixel electrodes 510, 520, and 530. As a result, the parasitic capacitance between the gate line 101 and the sub-pixel electrodes 510, 520, and 530 may decrease, thereby providing a display device having ultra high resolution and good visibility. As the influence of the gate line 101 on the sub-pixel electrode 510, 520, and 530 decreases, the kickback voltage decreases.

A passivation layer 550 is disposed on the first and second TFTs 601 and 602 and across the entire insulating substrate 10. The passivation layer 550 may include an inorganic material.

As shown in FIG. 2, the storage electrode lines 401a and 401b forming the storage capacitors Cst1, Cst2, and Cst3 with the first second data lines 201 and 202 and the sub-pixel electrodes 510, 520, and 530 are disposed symmetrically about the center line CL of the pixel area PA. As a result, the parasitic capacitance may decrease, thereby decreasing vertical crosstalk. Thus, the image quality of the display device may be improved.

Figure 4:
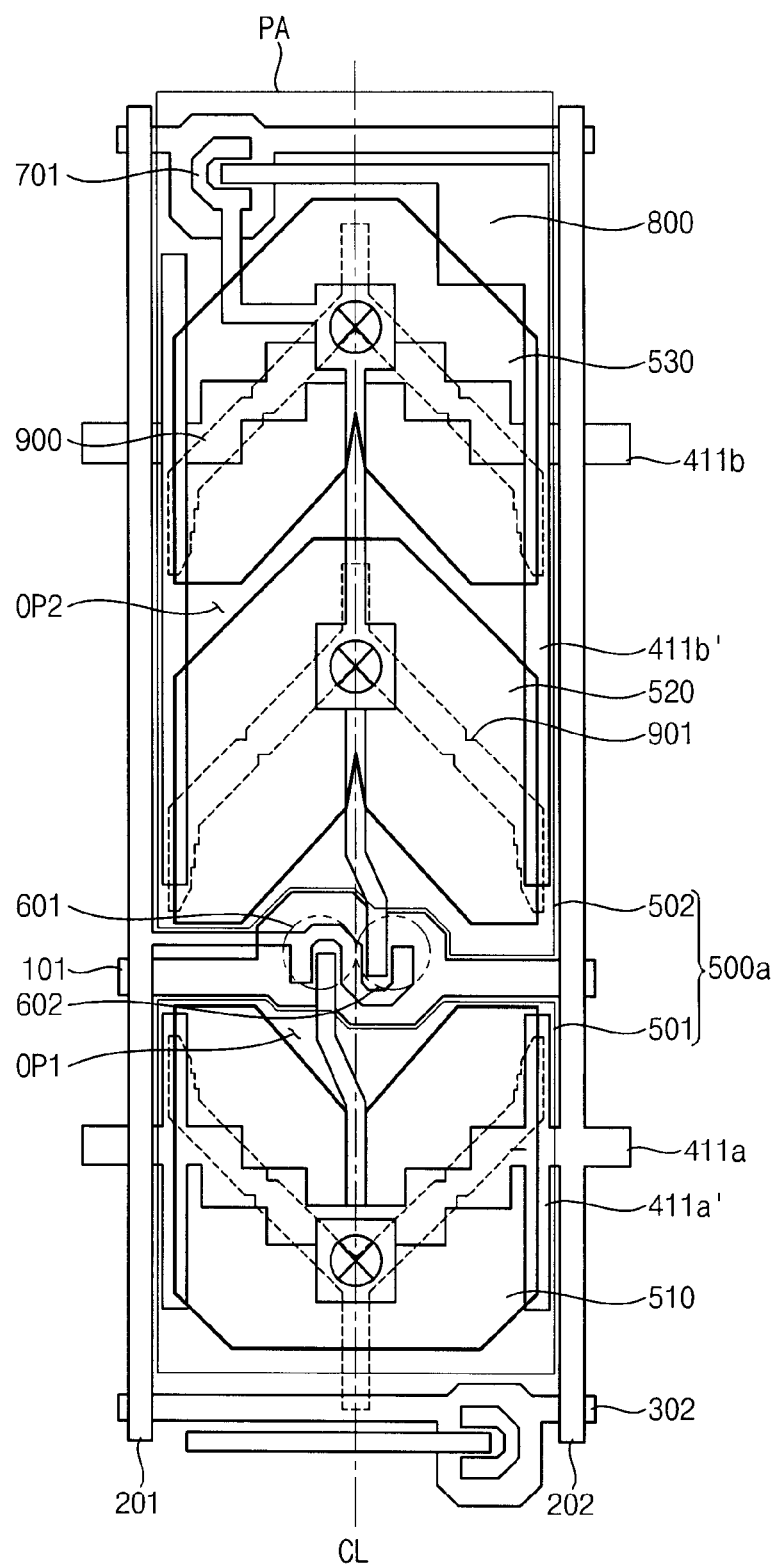
FIG. 4 is a plan view of the display device in accordance with another exemplary embodiment of the present invention.

FIG. 4 is a plan view of the display device in accordance with another exemplary embodiment.

The storage electrode lines 411a and 411b are formed stepwise to correspond to the shape of a domain control part 900 formed on the first substrate 1000. Because the storage electrode lines 411a and 411b are formed stepwise, distortion of the electric field may be reduced and image quality may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display substrate, comprising:
   a plurality of pixels disposed in a matrix, each pixel comprising a first sub-pixel electrode and a second sub-pixel electrode to be charged with a different voltage than the first sub-pixel electrode, wherein a portion of each of the first sub-pixel electrode and the second sub-pixel electrode is V-shaped and the V-shaped portion of the first sub-pixel electrode faces the V-shaped portion of the second sub-pixel electrode;
   a gate line extending in a first direction;
   a first storage electrode line and a second storage electrode line extending in the first direction and capacitively coupled to the first sub-pixel electrode and the second sub-pixel electrode, respectively;
   a charge control line extending in the first direction and coupled to the second sub-pixel electrode; and
   a first data line and a second data line extending in a second direction and crossing the gate line.

2. The display substrate of claim 1, further comprising:
   a first thin film transistor (TFT) to connect the gate line and the first data line with the first sub-pixel electrode;
   a second TFT to connect the gate line and the first data line with the second sub-pixel electrode.

3. The display substrate of claim 2, further comprising:
   a third TFT comprising a source electrode connected to the drain electrode of the second TFT, a drain electrode connected to the second storage electrode line, and a gate electrode controlled by the charge control line.

4. The display substrate of claim 3, wherein the charge control line is a next stage gate line.

5. The display substrate of claim 3, wherein the charge control line is disposed in an upper portion of the pixel.

6. The display substrate of claim 3, wherein the first TFT and the second TFT are disposed in an open region between the first sub-pixel electrode and the second sub-pixel electrode.

7. The display substrate of claim 3, wherein the first TFT, the second TFT, and the third TFT are spaced apart from the first sub-pixel electrode and the second sub-pixel electrode.

8. The display substrate of claim 3, wherein the gate line is spaced apart from the first sub-pixel electrode and the second sub-pixel electrode.

9. The display substrate of claim 3, wherein the second sub pixel electrode comprises a first portion and a second portion spaced apart from the first portion, and each of the first portion and the second portion is independently capacitively coupled to the second storage electrode line.

10. A liquid crystal display device, comprising:
    a first substrate comprising a domain control part;
    a second substrate opposite the first substrate, the second substrate comprising;
        a plurality of pixels disposed in a matrix, each pixel comprising a first sub-pixel electrode and a second sub-pixel electrode to be charged with a different voltage than the first sub-pixel electrode, wherein a portion of each of the first sub-pixel electrode and the second sub-pixel electrode are V-shaped and the V-shaped portion of the first sub-pixel electrode faces the V-shaped portion of the second sub-pixel electrode,
    a gate line extending in a first direction;
    a first storage electrode line and a second storage electrode line extending in the first direction and capacitively coupled to the first sub-pixel electrode and the second sub-pixel electrode, respectively;
    a charge control line extending in the first direction and coupled to the pixel; and
    a first data line and a second data line extending in a second direction and crossing the gate line; and
    a liquid crystal layer disposed between the first substrate and the second substrate.

11. The liquid crystal display device of claim 10, comprising:
    a first thin film transistor (TFT) to connect the gate line and the first data line with the first sub-pixel electrode;
    a second TFT to connect the gate line and the first data line with the second sub-pixel electrode.

12. The liquid crystal display device of claim 11, further comprising:
    a third TFT including a source electrode connected to the drain electrode of the second TFT, a drain electrode connected to the second storage electrode line, and a gate electrode controlled by the charge control line.

13. The liquid crystal display device of claim 12, wherein the charge control line is a next stage gate line.

14. The liquid crystal display device of claim 12, wherein the charge control line is disposed in the upper portion of the pixel.

15. The liquid crystal display device of claim 12, wherein the first TFT and the second TFT are disposed in an open region between the first sub-pixel electrode and the second sub-pixel electrode.

16. The liquid crystal display device of claim 12, wherein the first TFT, the second TFT, and third TFT are spaced apart from the first sub-pixel electrode and the second sub-pixel electrode.

17. The liquid crystal display device of claim 12, wherein the gate line is spaced apart from the first sub-pixel electrode and the second sub-pixel electrode.

18. The liquid crystal display device of claim 10, wherein the second sub pixel electrode comprises a first portion and a second portion spaced apart from the first portion, and each of the first portion and the second portion is independently capacitively coupled to the second storage electrode line.

19. The liquid crystal display device of claim 18, wherein the first storage electrode line and the second storage electrode line are formed stepwise to correspond to a shape of the domain control part.

20. The liquid crystal display device of claim 10, wherein odd pixels are connected to the first data line and even pixels are connected to the second data line.

* * * * *